US005126531A

United States Patent [19]

Majima et al.

[11] Patent Number: 5,126,531

[45] Date of Patent: Jun. 30, 1992

[54] APPARATUS FOR MAKING AN INTAGLIO PRINTING SURFACE

[75] Inventors: Osamu Majima, Tokyo; Kazuo Kobayashi; Sohichi Kuwahara, both of Kanagawa, all of Japan

[73] Assignee: Sony Corporation, Tokyo, Japan

[21] Appl. No.: 404,555

[22] Filed: Sep. 8, 1989

[30] Foreign Application Priority Data

Sep. 13, 1988 [JP] Japan ................................ 63-229483

[51] Int. Cl.[5] ........................ B23K 26/08; B41C 1/00; B41C 1/18

[52] U.S. Cl. ............................ 219/121.68; 101/401.1

[58] Field of Search ...................... 101/401.1, 487, 150; 219/121.68, 121.69

[56] References Cited

U.S. PATENT DOCUMENTS 3,374,311 3/1968 Hell .............................. 101/401.1 X
3,549,733 12/1970 Caddell ......................... 101/401.1 X
3,832,948 9/1974 Barker ............................. 101/401.1
4,245,003 1/1981 Oransky et al. ............ 101/401.1 X
4,388,865 6/1983 Kellner ............................ 101/401.1
4,395,946 8/1983 Price .......................... 101/401.1 X

FOREIGN PATENT DOCUMENTS 1459048 12/1976 United Kingdom .
1465364 2/1977 United Kingdom .
2030929 4/1980 United Kingdom .
2071574 9/1981 United Kingdom .

*Primary Examiner*—Clifford D. Crowder
*Attorney, Agent, or Firm*—Lewis H. Eslinger; Jay H. Maioli

[57] ABSTRACT

Apparatus for making a plate cylinder of an intaglio plate that can be used in gravure printing. The apparatus includes a printing plate sheet made of a thermoplastic resin and wrapped around a metal cylinder. A semiconductor laser source irradiates the circumferential surface of the printing plate sheet with a laser beam to form concave portions or cells on the circumferential surface of the printing plate sheet in response to the tones of a picture. The sheet with the holes formed therein is used as a printing plate. A plate cylinder for intaglio printing is thus formed directly by using an electrical signal.

1 Claim, 5 Drawing Sheets

APPARATUS FOR MAKING AN INTAGLIO PRINTING SURFACE

BACKGROUND OF THE INVENTION

1 Field of the Invention

The present invention relates generally to gravure printing and, more particularly to novel and highly effective apparatus for making a plate cylinder of an intaglio plate that can be used in gravure printing.

2. Description of the Prior Art

Various kinds of printing systems have been proposed, which effect relief printing, offset printing, intaglio printing, silk screen printing or the like. Intaglio printing is frequently used to print multiple copies of an image such as a photograph at high speed. A method of manufacturing a gravure printing plate, which is most practical in intaglio printing, will be explained with reference to FIGS. 1A to 1F.

The lights and shades of a document (e.g. a photograph) are developed on the surface of the plate cylinder for gravure printing in such a manner that holes are made whose areas or depths correspond to the lights and shades. Then the metal surface of the plate cylinder is etched to form collections of small cells or concave portions of different areas or of different depths, and an ink is filled into these concave portions, thereby carrying out the printing.

In the conventional method of manufacturing a gravure printing plate, a gelatin film 2 is coated on a paper 1 as shown in FIG. 1A to form a carbon tissue 3, and the carbon tissue 3 is immersed in an aqueous solution of potassium dichromate so as to give a photosensitive property thereto.

As shown in FIG. 1B, the carbon tissue 3 is then exposed to light through a mesh screen 4 having a mesh size of 8 lines/mm. The exposed carbon tissue 3 is subsequently exposed to light by using a positive film 5 wherein a picture to be printed is recorded. The gelatin film 2 is thereby hardened at its exposed portion.

Next, as shown in FIG. 1C, the gelatin film 2 of the carbon tissue 3 is deposited on a copper cylinder 6, and the paper 1 is removed.

The gelatin film 2 at its portions that have not been hardened by the exposing process is then dissolved in hot water (about 40° C.) and removed, as shown in FIG. 1D.

The surface of the copper cylinder 6 is then etched by the immersion-diffusion process using an aqueous solution of ferrous chloride, as shown in FIG. 1E.

The hardened gelatin film 2 is removed to produce a gravure printing plate 7, as shown in FIG. 5F. This gravure printing plate 7 is used as a plate cylinder 7.

The plate cylinder 7 thus formed is partially immersed into a solvent-type ink 10 as shown in FIG. 2, and any excess ink 10 on the surface of the plate cylinder 7 is removed by a doctor blade 11. The doctor blade 11 is a knife having a sharp edge and is urged against the surface of the plate cylinder 7 so that the doctor blade 11 removes essentially all of the ink except that which is filled into a large number of concavities (these concavities will hereinafter be referred to as cells) formed on the printing surface of the plate cylinder 7.

An impression cylinder 12 presses a paper 13 to be printed against the printing surface of the plate cylinder 7, whereby the paper 13 adsorbs the ink 10 as shown in FIG. 3. The concentration of the ink 10 adsorbed is changed with the depths of the cells formed on the printing surface of the plate cylinder 7 by the etching process. In particular, a cell of relatively great volume (i.e. of relatively great area or depth) contains a relatively large amount of ink so that the concentration of the ink is relatively high, whereas a cell of relatively small volume (i.e. of relatively small area or depth) contains less ink so that the concentration of the ink is relatively low.

The plate cylinder for gravure printing according to the prior art is custom-manufactured for each printing process and is suitable for producing a large number of copies. However, if this plate cylinder is used for printing only several tens or several thousands of copies, the printing cost per copy is considerably increased. Further, the plate cylinder for the prior-art gravure printing requires not only a complicated manufacturing process but also a process for making a transparent positive image film, so that an increased number of process steps is required. Furthermore, it is necessary that copper be plated on the plate cylinder 7 and that a metal cylinder be employed for the etching process. Thus the manufacturing process for the plate cylinder is increased in scale and too expensive to be suitable for office use or personal use.

OBJECTS AND SUMMARY OF THE INVENTION

Accordingly, it is an object of the present invention to provide improved apparatus for making a printing plate that eliminates the above-noted defects encountered with the prior art.

More specifically, an object of the present invention is to provide apparatus for making a printing plate by which the process for making the printing plate can be simplified.

It is another object of the present invention to provide apparatus for making a printing plate in which a printing plate can be made directly by individual end users.

It is still another object of the present invention to provide apparatus for making a printing plate in which a printing plate can be directly made by using an electrical signal so that various kinds of image data can be supplied as an input.

According to an aspect of the present invention, there is provided an apparatus for making a printing plate comprising: a cylinder; a thermoplastic resin sheet wrapped around the cylinder; first drive means coupled to the cylinder for rotating the cylinder at a predetermined rate; laser beam projection means for projecting a laser beam on the resin sheet to alter the resin sheet in accordance with image information; and second drive means coupled to the laser beam projection means for moving the laser beam projection means in an axial direction of the cylinder at a predetermined rate.

These and other objects, features and advantages of the present invention will be apparent from the following detailed description of a preferred embodiment thereof when read in conjunction with the accompanying drawings, in which like reference numerals are used to represent similar or the same parts in the several views.

DESCRIPTION OF THE PREFERRED EMBODIMENT

An embodiment of an apparatus for making a plate cylinder of an intaglio plate according to the present invention will hereinafter be described with reference to FIGS. 4 to 7.

Figure 1A:
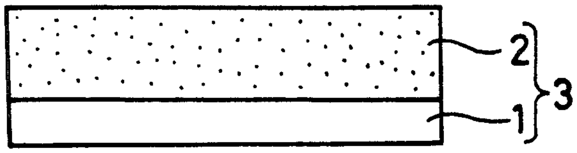
FIG. 1A (PRIOR ART)
FIGS. 1A to 1F are process diagrams illustrating successive steps in the manufacture of a gravure printing plate according to the prior art.
Figure 1B:
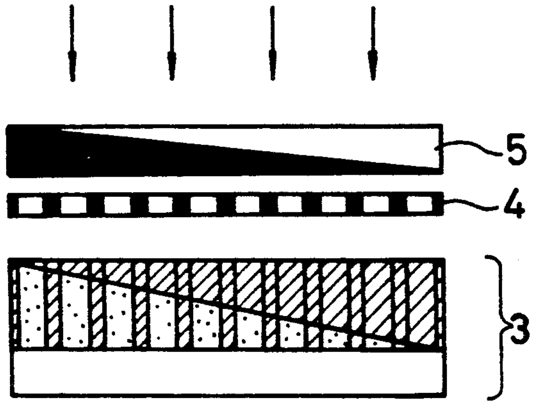
FIG. 1B (PRIOR ART)
Figure 1C:
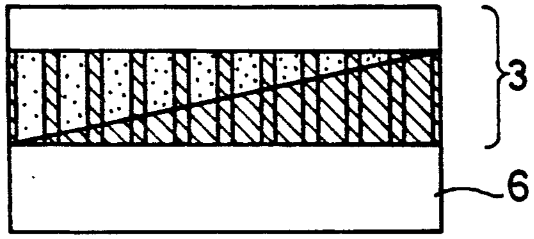
FIG. 1C (PRIOR ART)
Figure 1D:
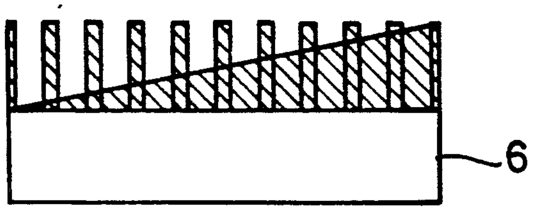
FIG. 1D (PRIOR ART)
Figure 1E:
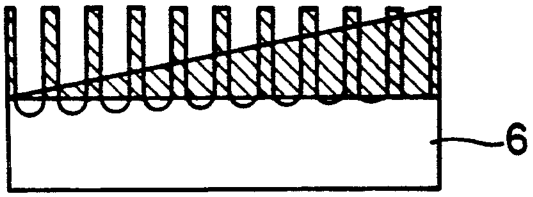
FIG. 1E (PRIOR ART)
Figure 1F:
FIG. 1F (PRIOR ART)
Figure 2:
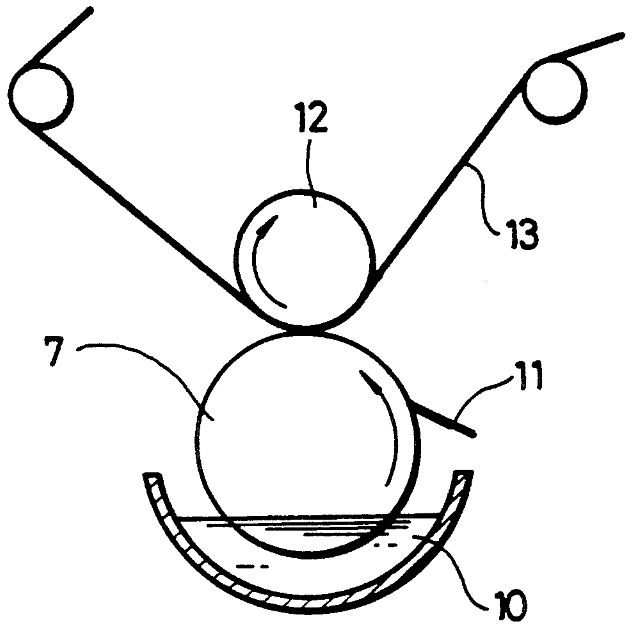
FIG. 2 (PRIOR ART)
FIG. 2 is a conceptual diagram to which reference will be made in explaining gravure printing.
Figure 3:
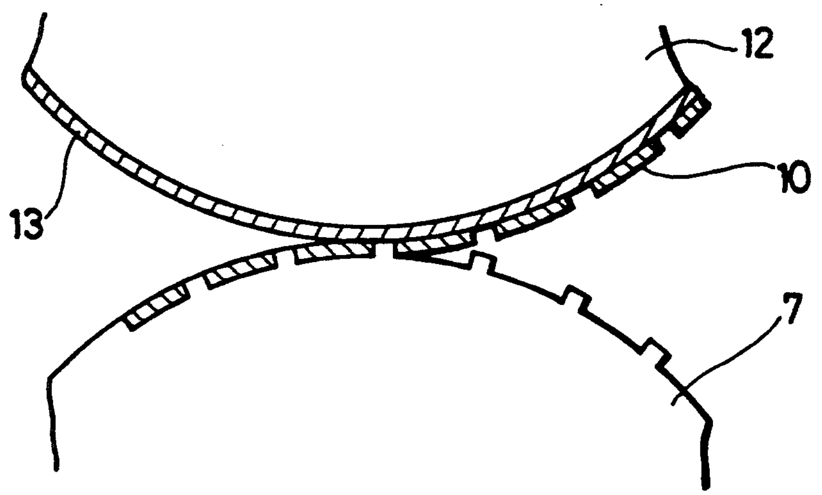
FIG. 3 (PRIOR ART)
FIG. 3 is an enlarged diagram of a main portion of a printing plate cylinder according to the prior art.
Figure 4:
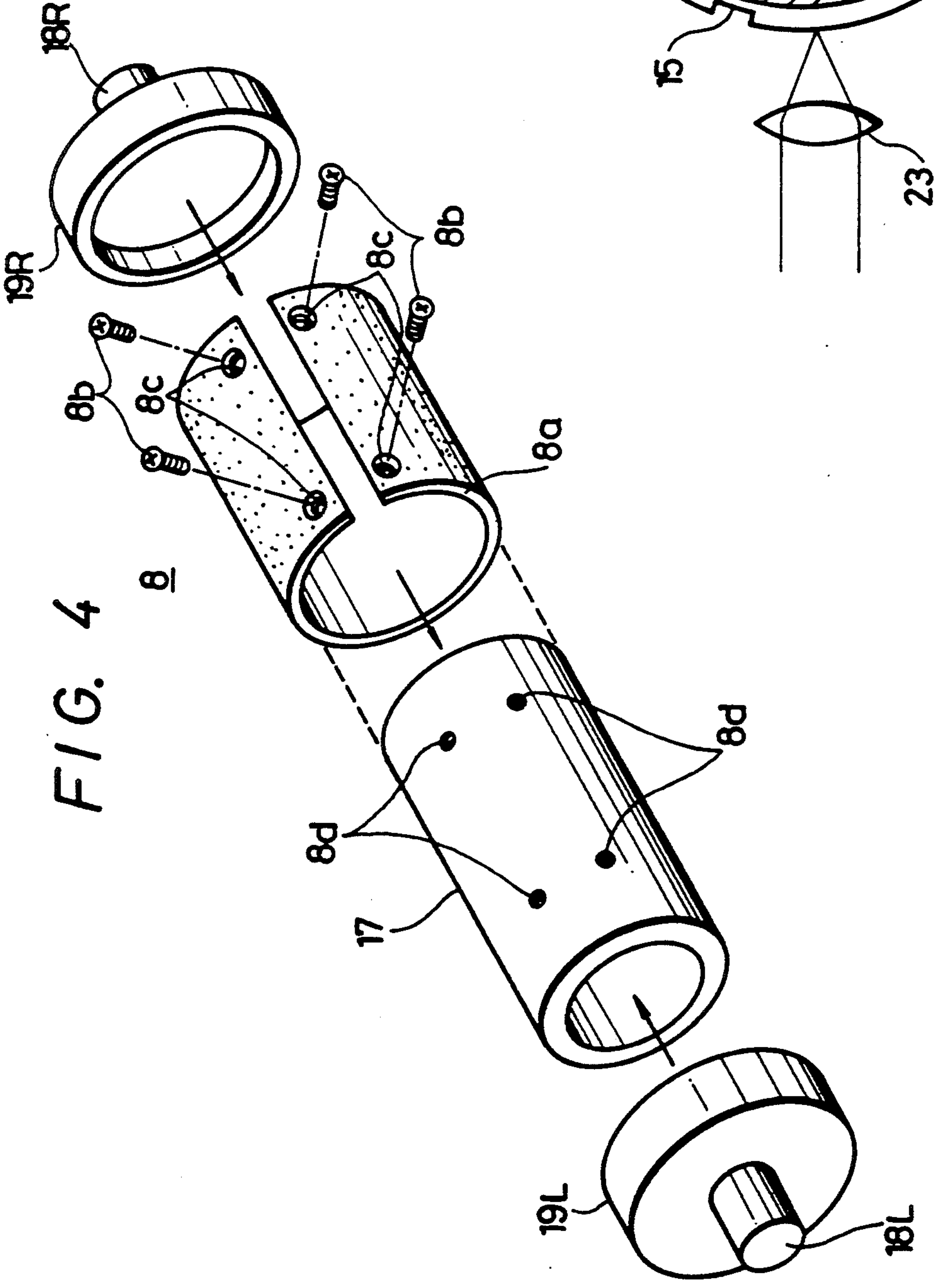
FIG. 4 is a perspective view of apparatus for making a plate cylinder of an intaglio plate according to an embodiment of the present invention, and illustrates the apparatus in an exploded state.
Figure 5:
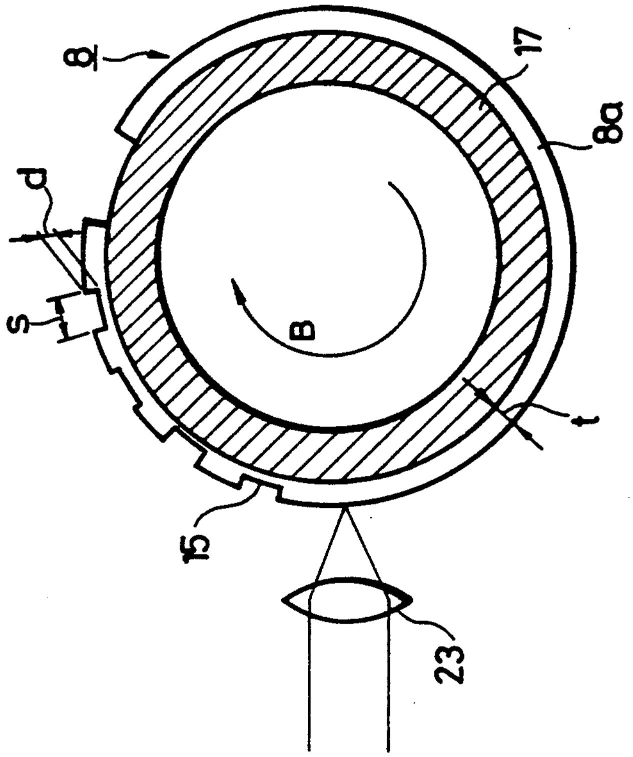
FIG. 5 is a sectional view in a plane normal to the cylinder axis of the apparatus shown in FIG. 4 and illustrates the assembled state.

FIG. 4 is an exploded, perspective view of the apparatus for making a printing plate according to an embodiment of the present invention, and FIG. 5 is a side sectional view of the apparatus when the parts shown in FIG. 4 are assembled.

In FIGS. 4 and 5, reference numeral 17 designates a cylinder made of metal. A plate sheet 8*a* made of a synthetic resin is wrapped around the outer surface of the cylinder 17 and is secured to the cylinder 17 by screwing countersunk screws 8*b* or the like through apertures 8*c* bored through the plate sheet 8*a* into nuts 8*d* formed in the cylinder 17. The plate sheet 8*a* can be secured to the cylinder 17 by using other suitable means such as a double-faced adhesive tape and the like.

As the material for the plate sheet 8*a*, it is preferable to use a thermoplastic resin having a relatively narrow distribution range of a melting or sublimating point and having proper hardness when it is cooled to room temperature, and in which when heated, the resin is easily scattered or sublimated. For example, the thermoplastic resin may be polyethylene resin, acrylic resin or polypropylene resin containing carbon in an amount of about 20 percent by weight. The thickness t of the plate sheet 8*a* is selected to be about 200 micrometers. Metal caps 19L, 19R are inserted into left and right ends of the cylinder 17 so that they fix the left and right ends of the plate sheet 8*a*, thus forming the plate cylinder 8. Shafts 18L, 18R are integral with the caps 19L, 19R and are coupled to a plate cylinder rotating motor 36 (as will be described later in connection with FIG. 7), whereby the plate cylinder 8 is rotated at a revolution rate of once per about 2.5 seconds in the direction shown by an arrow B in FIG. 5.

A laser beam is caused to impinge on the plate cylinder 8 through an objective lens 23 (FIGS. 5 and 6) and is focused on the surface of the plate sheet 8*a* made of synthetic resin, heating the plate surface to thereby melt, scatter or sublimate the synthetic resin.

If the intensity of the laser beam is modulated, or if the time during which one recess or cell 15 is irradiated with the laser beam is changed, the depth or size of the cell 15 from which the plate surface material (synthetic resin) is scattered or sublimated can be adjusted. Therefore, the volume of the cell 15 can be adjusted in accordance with the tone of the image. In other words, the depth d or the area s of the cell 15 can be varied by the amount of the plate surface material that is scattered by the laser beam in response to the tone of the input video signal, as shown in FIG. 5.

Figure 6:
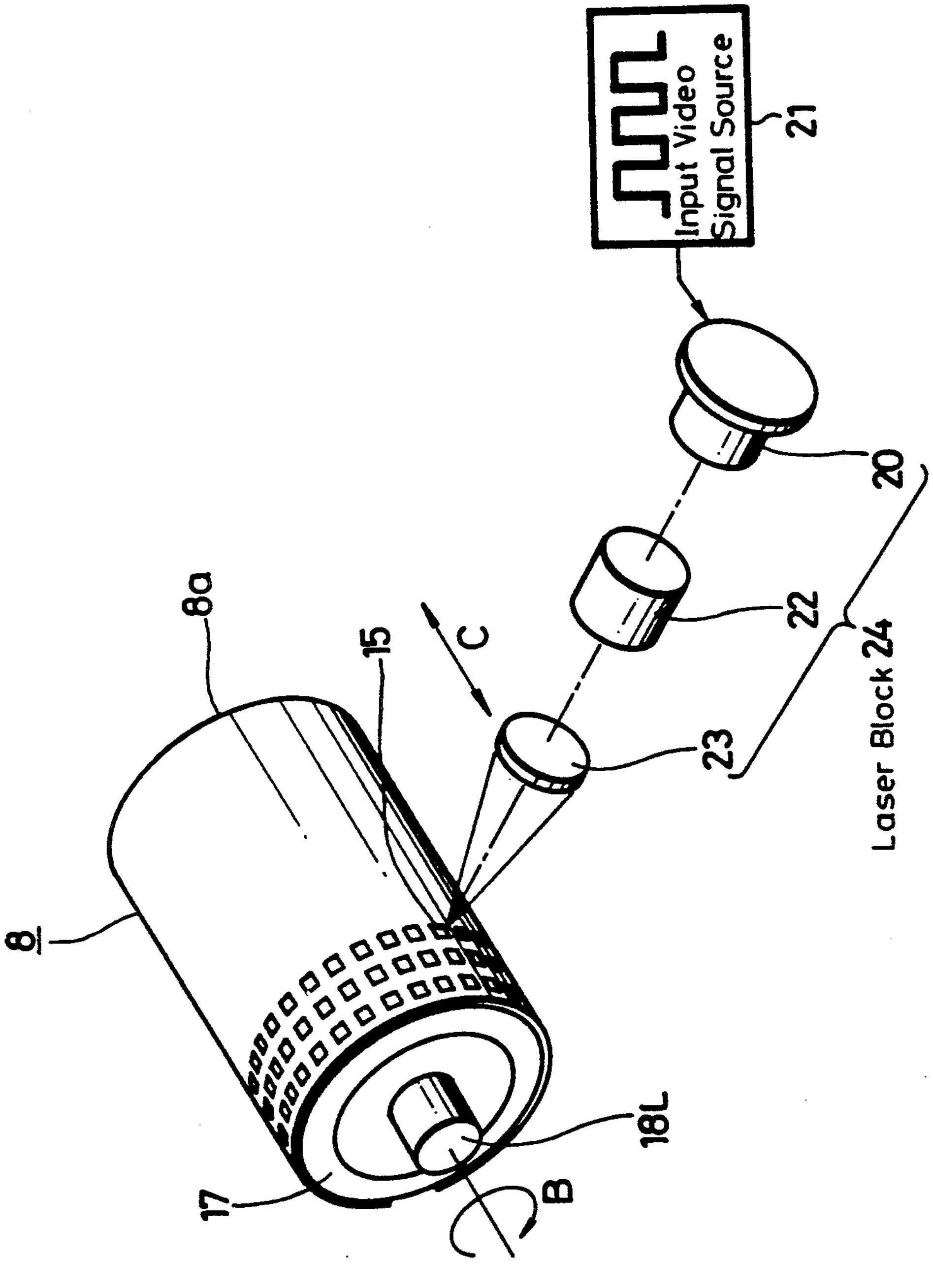
FIG. 6 is a schematic perspective view of a laser optical system used in the apparatus of the present invention.

FIG. 6 is a conceptual diagram in which the cell 15 is formed on the plate sheet 8*a* by using a small energy-emitting semiconductor laser 20 whose power is about 1 W.

It will be seen in FIG. 6 that a signal, taken in by an image scanner or the like, is supplied from a video input signal source 21 to the semiconductor laser 20, whereby the laser beam is directly modulated by the input video signal that results from pulse code modulating a drive current. As a result, the laser beam emitted from the semiconductor laser 20 is turned on and off in synchronism with the video signal. The laser beam emitted from the semiconductor laser 20 is collimated to form a laser beam whose rays are parallel by a collimating optical system 22 and is focused at a predetermined position on the surface of the plate sheet 8*a* through an objective lens 23. The semiconductor laser 20, the collimating optical system 22 and the objective lens 23 constitute a laser block 24, and this laser block 24 is initially located so as to focus its laser beam at a predetermined position on the leftmost side of the plate cylinder 8. The plate cylinder 8 is rotated by the plate cylinder rotating motor 36 shown in FIG. 7 in the direction shown by the arrow B in FIG. 6 so that, when the plate cylinder 8 is rotated once, the laser beam scatters the surface of the plate sheet 8*a* along the circumference of the plate sheet 8*a*, thereby forming the cells 15 of a first predetermined track. The laser block 24 is then moved in the axial direction of the plate cylinder 8 a distance corresponding to the length in the axial direction of one picture element, and, while the plate cylinder 8 continues to rotate, the laser beam again scatters the surface of the plate sheet 8*a*, thereby forming the cells 15 of a second predetermined track. By sequentially carrying out the scanning described above over the entire surface of the plate cylinder 8, it is possible to scatter the synthetic resin material on the surface of the plate sheet 8*a* to form thereon the cells 15 corresponding to the tones represented by the input video signal.

Figure 7:
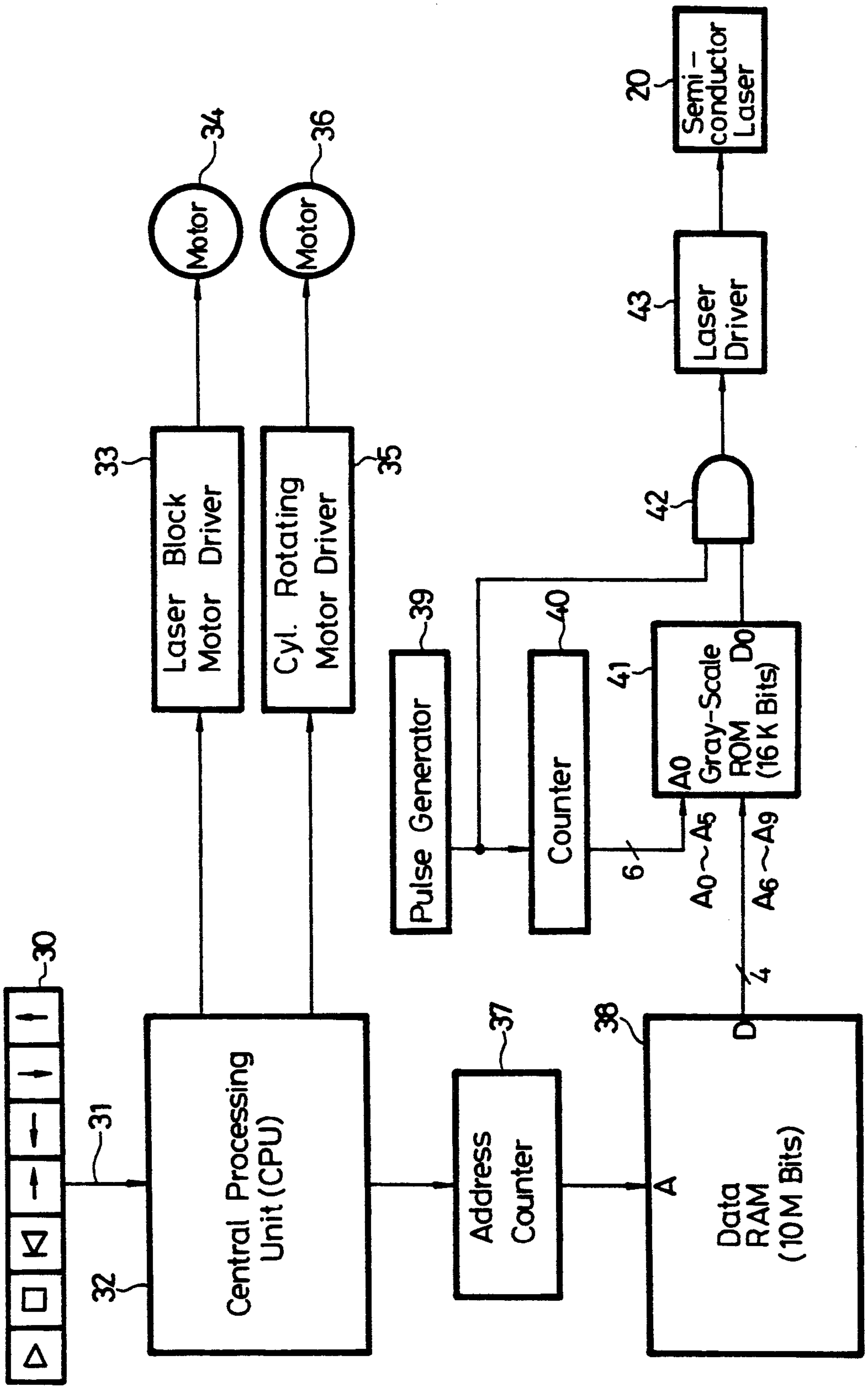
FIG. 7 is a schematic block diagram to which reference will be made in explaining the laser scanning system of the present invention.

FIG. 7 is a schematic block diagram of an arrangement by which data corresponding to the tones of the input video signal are supplied to the semiconductor laser 20.

It will be seen in FIG. 7 that an input operation portion 30 supplies a status signal 31 such as stop, reset and the like to a microcomputer 32. The microcomputer 32 is what might be called a central processing unit (CPU) and will hereinafter be referred to as a CPU. The CPU 32 supplies pulses for forward or reverse rotation to a laser block moving motor driver 33 and to a plate cylinder rotating motor driver 35, thereby driving the laser block moving motor 34 and the plate cylinder rotating motor 36. The plate cylinder driving motor 36 rotates the plate cylinder 8, and the semiconductor laser 20 forms the cells 15 corresponding to the data of the input video signal on the surface of the plate sheet 8*a*. At the end of each complete rotation of the plate cylinder 8, the laser block moving motor 34 rotates to move the laser block 24 linearly by the amount of one picture element, thereby forming the cells 15 corresponding to the tone of the picture along the circumference of the plate cylinder 8 under the control of the CPU 32.

The image signal taken in by the image scanner or the like is converted to a digital signal at a rate of 4 bits per pixel and is stored in a data random access memory (RAM) 38 as image data D.

The CPU 32 supplies a count pulse to an address counter 37, and the address counter 37 sequentially supplies a read address A to the data RAM 38.

The image data D from the data RAM 38 is supplied to address $A_6$ to $A_9$ of a gray-scale read only memory (ROM) 41 for modulation. The gray-scale ROM 41 is supplied at its addresses $A_0$ to $A_5$ with an output of a counter 40 that counts a clock pulse of about 200 kHz generated by a pulse generator 39.

The gray-scale ROM 41 has a table map for the modulation, in which the addresses $A_0$ and $A_5$ thereof change with image data in a range of from "000000" to "111111." The gray-scale ROM 41 produces a pulse width modulated (PWM) pulse for each of the image data. This PWM pulse is used to gate the clock pulse in a gate 42, and the gate 42 supplies a laser driver 43 with clock pulses whose number corresponds to the density of the picture element. In this manner, the semiconductor laser 20 is driven. The reason that the output of the counter 40 is produced in the form of 6 bits is to effect a so-called nonlinear conversion such as gamma correction and the like.

As described above, in accordance with the present invention, the size of the cells 15 formed on the surface of the plate sheet 8*a* is changed by varying the number of laser beam pulses in response to the value of image data.

Further, in this embodiment, a heat absorbing agent such as carbon or the like is contained in the thermoplastic resin material, which is melted at low temperature in order to improve its heat absorbing property, and the plate sheet surface is directly scattered by a small energy source such as a semiconductor laser having a power of about 1 W. The complicated process for making the plate cylinder required in the prior art can be avoided, and a gravure plate can be directly made in an office or by individuals at home.

Furthermore, since the printing plate can be directly made by an electrical signal, various kinds of image data can be supplied.

In the apparatus described above for making an intaglio plate cylinder, since the semiconductor laser is used to locally heat the printing sheet made of thermoplastic resin in order to form the cells, the process for making the printing plate is simplified. Thus, the end user can make the printing plate directly, and an inexpensive plate cylinder for the intaglio plate can be made by an electrical signal in an office or the like.

The present invention is not limited to the precise embodiment thereof described above. For example, the cells 15 may be formed in successive axial tracks that are formed in response to actuation of the motor 34 and are caused to be displaced circumferentially by actuation of the motor 36. Many other changes and modifications can be effected by one skilled in the art without departing from the spirit or scope of the novel concepts of the invention as defined in the appended claims.

We claim:

1. Apparatus for making a printing plate comprising:
a cylinder;
a thermoplastic resin sheet wrapped around said cylinder, said thermoplastic resin sheet including about 20 percent by weight of carbon as a heat absorbing material for improving heat exchange characteristics of the thermoplastic resin sheet in interaction with a heat source;
first drive means coupled to said cylinder for rotating said cylinder at a predetermined rate;
means for generating pulse-number-modulated drive pulses;
semiconductor laser beam projection means responsive to said drive pulses and having a power not substantially exceeding one watt for projecting a laser beam on said resin sheet to act as a heat source and alter the resin sheet in accordance with image information; and
second drive means coupled to said laser beam projection means for moving said laser beam projection means in an axial direction of said cylinder at a predetermined rate;
whereby said laser beam sublimates a variable amount of said resin sheet in accordance with said image information.

* * * * *